(12) United States Patent
Akiyama et al.

(10) Patent No.: US 6,498,295 B1
(45) Date of Patent: Dec. 24, 2002

(54) SIDE INSERTION TRAP

(75) Inventors: Steven Randall Akiyama, New Lenox, IL (US); Gabriel P. Gromotka, Christianbsurg, VA (US); Thomas J. DeCicco, Algonquin, IL (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 09/691,201

(22) Filed: Oct. 19, 2000

Related U.S. Application Data

(63) Continuation-in-part of application No. 09/177,111, filed on Oct. 22, 1998, now Pat. No. 6,147,307.

(51) Int. Cl.[7] .................................................. H02G 3/18
(52) U.S. Cl. .................. 174/65 G; 174/135; 174/65 R; 248/56; 16/2.1; 16/2.2
(58) Field of Search ............................ 174/65 R, 65 G, 174/50, 58, 135, 152 G, 153 G, 31 R; 248/56, 62, 63; 16/2.1, 2.2; 220/3.2, 3.8, 4.12

(56) References Cited

U.S. PATENT DOCUMENTS

| 3,123,662 | A |   | 3/1964  | Fink |
| 3,424,856 | A |   | 1/1969  | Coldren |
| 3,493,205 | A |   | 2/1970  | Bromberg |
| 3,562,847 | A |   | 2/1971  | Jemison |
| 3,564,113 | A |   | 2/1971  | Kindler |
| 3,991,446 | A |   | 11/1976 | Mooney et al. |
| 4,000,875 | A |   | 1/1977  | Jemison et al. |
| 4,056,252 | A |   | 11/1977 | Simon |
| 4,142,064 | A |   | 2/1979  | Thomsen |
| 4,188,003 | A |   | 2/1980  | Ramsey |
| 4,190,222 | A |   | 2/1980  | Appleton et al. |
| 4,262,409 | A |   | 4/1981  | Madej |
| 4,269,378 | A |   | 5/1981  | Barry |
| 4,299,363 | A |   | 11/1981 | Datschefski |
| 4,350,839 | A |   | 9/1982  | Lass |
| 4,361,302 | A |   | 11/1982 | Lass |
| 4,366,343 | A |   | 12/1982 | Slater et al. |
| 4,474,489 | A |   | 10/1984 | Simon |
| 4,678,146 | A |   | 7/1987  | Plyler |
| 4,919,370 | A |   | 4/1990  | Martin et al. |
| 4,990,721 | A | * | 2/1991  | Sheehan ................... 174/65 R |
| 6,211,465 | B1 | * | 5/2001  | Stoeit ....................... 174/65 G |
| 6,248,952 | B1 | * | 6/2001  | Reeves et al. ............ 248/56 X |
| 6,254,041 | B1 | * | 7/2001  | DuFourg ..................... 248/65 |
| 6,278,061 | B1 | * | 8/2001  | Daoud ....................... 174/65 R |
| 6,297,457 | B1 | * | 10/2001 | Yamada et al. ............ 16/2.1 X |

* cited by examiner

*Primary Examiner*—Dean A. Reichard
*Assistant Examiner*—Dhiru R Patel

(57) ABSTRACT

An invertible side insertion trap is designed to be inserted into an opening in an electrical box and to accommodate at least two different sizes of cable or wire depending on an orientation of the trap. The trap includes a base, a first arm and a second arm. The first arm extends from the base and includes a first mating portion for mating with a first side of the opening in the electrical box. The second arm extends from the base. The arms create a passage having a first width for permitting insertion of a first cable or wire size between the arms when the trap is oriented in a first orientation with the first mating portion aligned with the first side of the opening. The passage has a second width for permitting insertion of a second cable or wire size between the arms when the trap is oriented in a second direction with the first mating portion aligned with a second side of the opening.

23 Claims, 15 Drawing Sheets

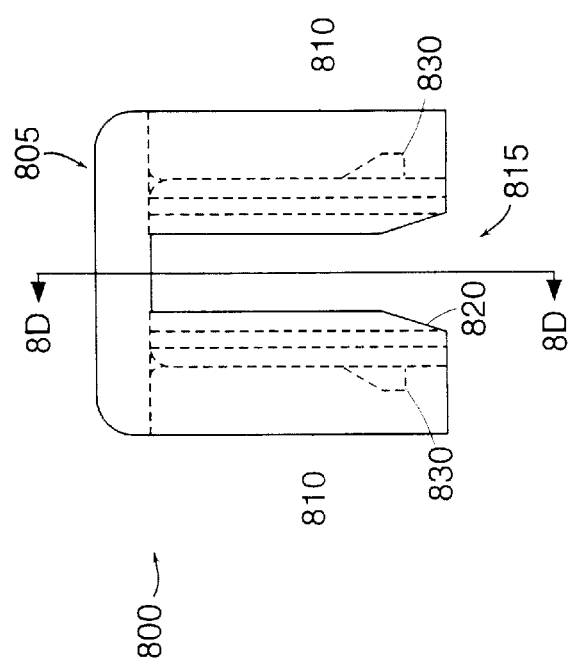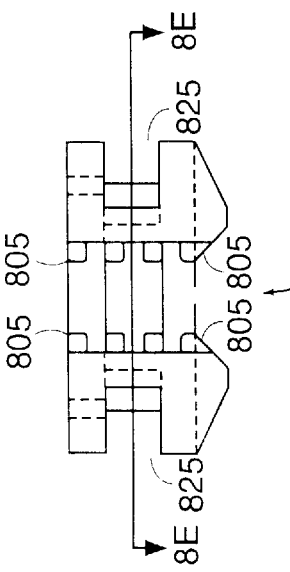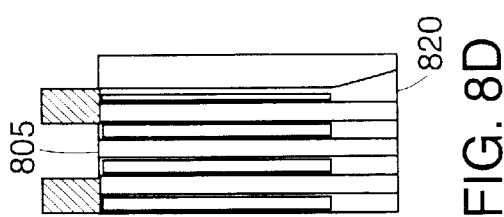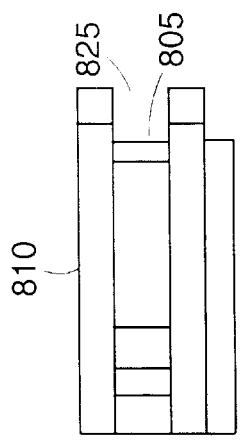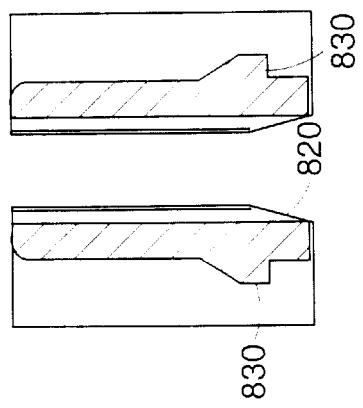

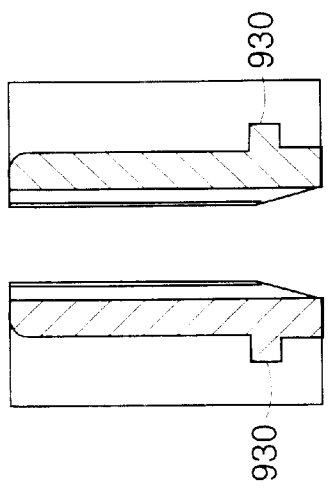
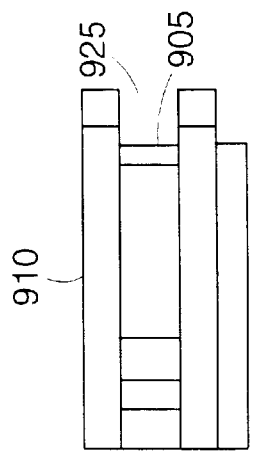
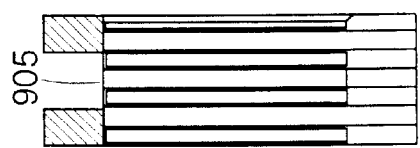
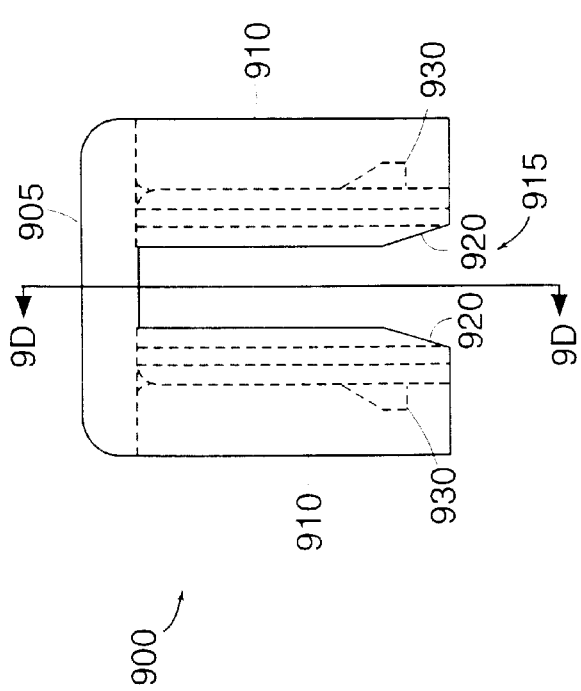
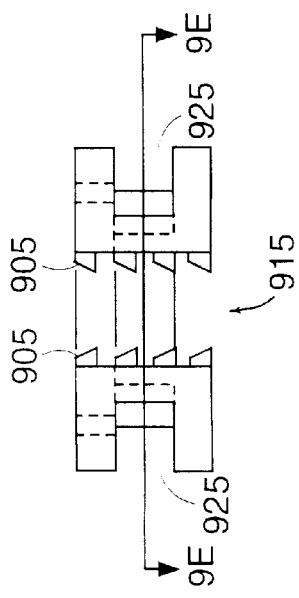

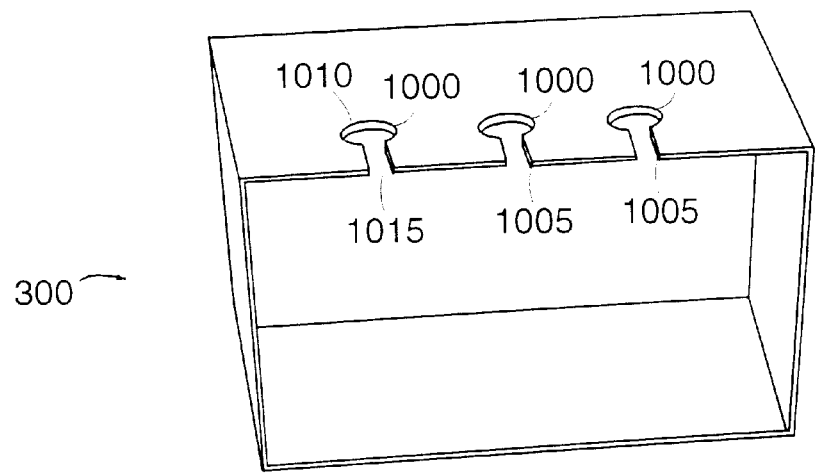
FIG. 10
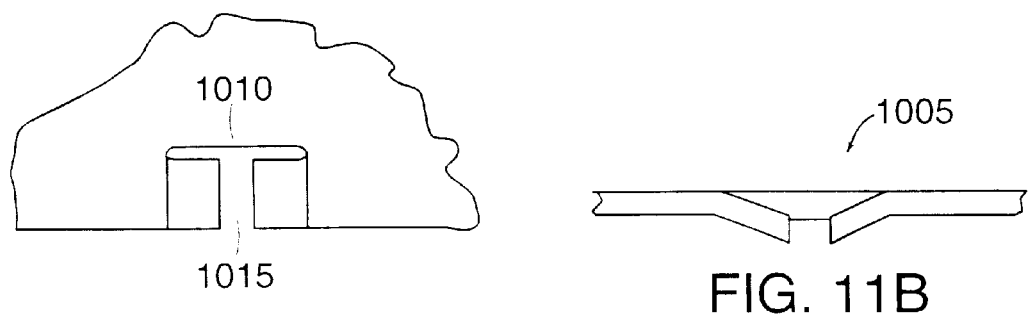
FIG. 11A
FIG. 11B
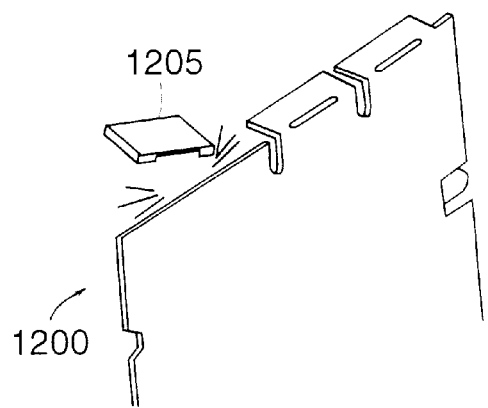
FIG. 12

SIDE INSERTION TRAP

RELATED APPLICATIONS

This application is a continuation-in-part of U.S. application Ser. No. 09/177,111, filed Oct. 22, 1998, now U.S. Pat. No. 6,147,307, which is incorporated by reference.

TECHNICAL FIELD

The invention relates to securing cables to an electrical box.

BACKGROUND

When electrical cables are inserted into an electrical box, such as a junction box, metal or plastic traps are used to secure the cables to the box. This prevents longitudinal forces from stressing wire connections in the box and separating the connections.

When a metal trap is used, a pre-punched knockout in the side of the box is removed and the metal trap is inserted in the resulting hole. The trap then is secured in place using a threaded nut in the interior of the box. The electrical cable is then threaded through the trap. Next, the wires of the cable are stripped and any excess cable is backed out of the electrical box. Two screws on the metal trap then are tightened to secure the electrical cable in place. Finally, the wires of the cable are connected and a cover is placed on the electrical box.

When a plastic trap is used, a pre-punched knockout is removed, and the plastic trap is inserted into the hole from which the knockout was removed. The cable then is inserted into the plastic trap. The wires then are stripped and connected. Finally, the cover is placed on the electrical box. Of course, the wires can be stripped before being placed into the plastic trap.

A representative electrical cable in both of these examples is a Romex cable, also known as non-metallic sheathed cable (type NM-B). Such a cable includes multiple conductors and an outer plastic protective sheath.

In both examples, an external trap is positioned in a knockout hole to ensure that the electrical cable remains in place.

SUMMARY

In one general aspect, an invertible side insertion trap is designed to be inserted into an opening in an electrical box and to accommodate at least two different sizes of cable or wire depending on an orientation of the trap relative to the opening. The invertible side insertion trap includes a base, a first arm and a second arm. The first arm extends from the base and includes a first mating portion for mating with a first side of the opening in the electrical box. The second arm extends from the base. The arms define a passage having a first width for permitting insertion of a first cable or wire size between the arms when the trap is oriented in a first orientation with the first mating portion aligned with the first side of the opening. The passage has a second width for permitting insertion of a second cable or wire size between the arms when the trap is oriented in a second direction with the first mating portion aligned with a second side of the opening.

Implementations of the invertible side insertion trap may include one or more of the following features. For example, the second arm may include a second mating portion for mating with the second side of the opening in the electrical box. The first mating portion may be configured to mate with the first side of the opening in the electrical box but not to mate with the second side of the opening in the electrical box. The second mating portion may be configured to mate with the second side of the opening in the electrical box but not to mate with the first side of the opening in the electrical box. The first mating portion may include a raised portion that extends from a surface of the first mating portion and the first side of the opening may include a region that is shaped as a negative of the raised portion. The raised portion that extends from the surface of the first mating portion may be configured not to fit within the second side of the opening of the electrical box.

The second mating portion may include a first raised portion extending from a surface of the second mating portion and a second raised portion extending from the surface of the second mating portion, and the second side of the opening may include a region that is shaped as a negative of the raised portion. The first raised portion and the second raised portion that extend from the surface of the second mating portion do not fit within the first side of the opening of the electrical box.

The arms may include teeth that protrude into the first passage and the second passage. The first arm may include a raised portion that extends from one surface of the first arm and the second arm may include a raised portion that extends from an opposite surface of the second arm.

In another general aspect, a system for retaining at least two different sizes of cables or wires in an invertible side insertion trap in an electrical box includes an electrical box and an invertible side insertion trap. The electrical box includes a first wall and a pair of additional walls connected by the first wall, with the first wall including at least one opening. The invertible side insertion trap includes a base and a pair of arms defining a passage. The arms and the opening are configured such that the passage has a first width when a first arm is positioned adjacent a first side of the opening and a second narrow width when the first arm is positioned adjacent a second side of the opening.

In implementations of the system, the invertible side insertion trap can have any of the features of the invertible side insertion trap described above.

The invertible side insertion trap provides considerable advantages. For example, using a single trap, wire and cable of different sizes can be retained in the trap. This reduces the number of parts needed when wiring electrical boxes.

In another general aspect, a side insertion trap for retaining cable or wire includes a base and two arms. The arms extend from the base to define an opening between the arms for permitting insertion of a cable or wire between the arms. A pair of jaws extends from the arms. Each jaw includes at least one tooth oriented in a direction towards the opposite tooth.

Implementations of the side insertion trap may include one or more of the following features. For example, the arms and the jaws may define a passage and the teeth may extend into the passage. Each jaw may extend from the arms at an angle to define a narrowing of the passage. The teeth may have a rectangular shape and define a surface oriented in the direction of the passage. The surface may include at least one protrusion and may include a textured surface. The teeth also may have a rounded or an angled shape.

In another general aspect, an electrical box includes at least one integral side insertion trap for retaining cable or wire. The electrical box includes a first wall including at least one opening and a pair of additional walls connected to the first wall. The integral side trap includes a pair of jaws that extend from the first wall on opposite sides of the opening.

Implementations of the side insertion trap may include one or more of the following features. For example, the jaws may define a passage and teeth may extend into the passage from the jaws. Each jaw may extend from the opening wall at an angle to define a narrowing of the passage. The teeth may have a rectangular configuration and may define a surface oriented in the direction of the passage.

The side insertion trap provides an inexpensive, labor saving, cable fitting for inserting and securing an electrical cable in an electrical box. The cable is laterally retained in the trap by a cover of the electrical box, and can be easily removed upon removal of the cover. Detents may be used to further secure the cable laterally.

By allowing lateral insertion of a wire or cable, the side insertion trap eliminates the need to thread the wire or cable through the trap. This permits insulation to be removed (and connections to be made) prior to insertion of the wire or cable into the trap. This, in turn, eases installation.

Other features and advantages will be apparent from the following description, including the drawings, and from the claims.

DESCRIPTION OF DRAWINGS

FIGS. 8A–8C are top, front, and side views of a third implementation of a side insertion trap.

FIG. 8D is a sectional view of the side insertion trap of FIG. 8A taken along line 8D—8D of FIG. 8A.

FIG. 8E is a sectional view of the side insertion trap of FIG. 8A taken along line 8E—8E of FIG. 8B.

FIGS. 9A–9C are top, front and side views of a fourth implementation of a side insertion trap.

FIG. 9D is a sectional view of the side insertion trap of FIG. 9A taken along line 9D—9D of FIG. 9A.

FIG. 9E is a sectional view of the side insertion trap of FIG. 9A taken along line 9E—9E of FIG. 9B.

FIG. 10 is a perspective view of an electrical box including a fifth implementation of a side insertion trap.

FIGS. 11A and 11B are top and side views of the side insertion trap of FIG. 10.

FIG. 12 is a perspective view of a cover of an electrical box with breakaway tabs for use with an electrical box containing side insertion traps.

DETAILED DESCRIPTION

Figure 1:
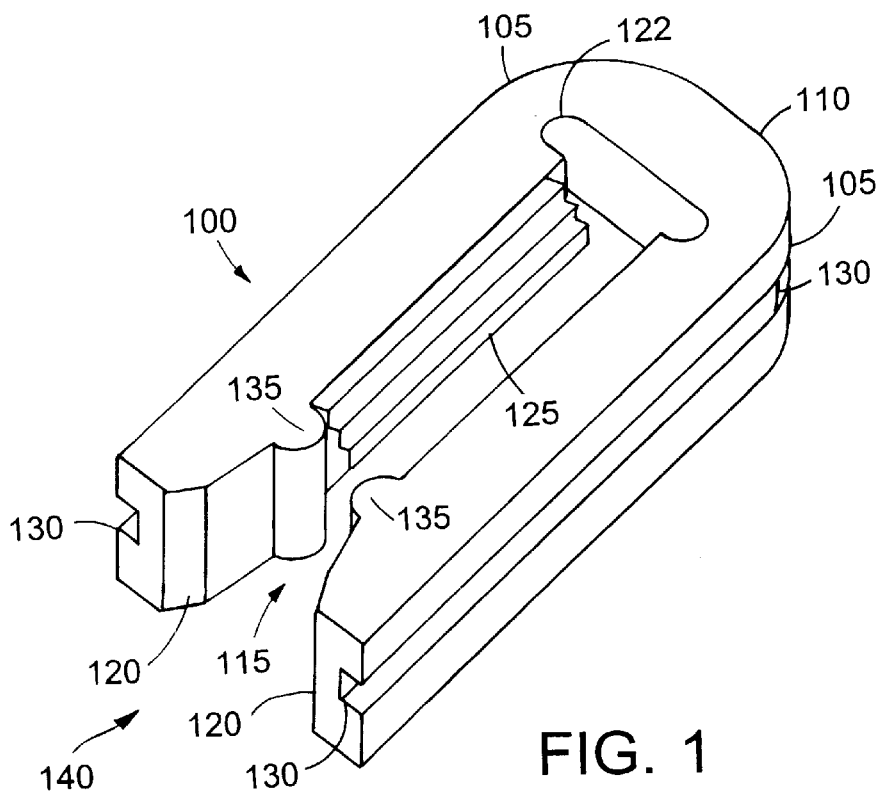
FIG. 1 is a perspective view of a side insertion trap.

Referring to FIGS. 1 and 2A–2C, a side insertion trap 100 is generally U-shaped and includes a pair of resilient arms 105 extending from a rear portion 110. The arms define a passage 115 into which a cable may be laterally inserted. To ease cable insertion, cutouts 120 on interior surfaces of the arm provide the passage with a flared opening. The arms 105 also include narrow regions 122 at their intersections with the rear portion 110. These narrow regions ease compression of the arms during insertion of the trap into a cutout.

Figure 2A:
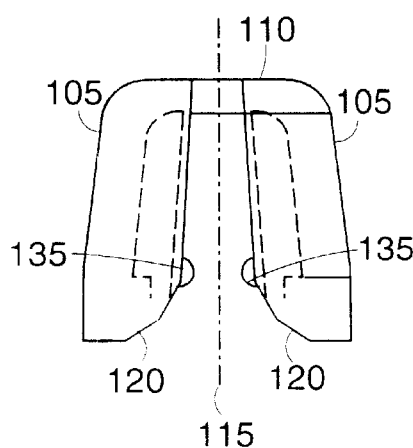
FIGS. 2A–2C are top, end and side views of the side insertion trap of FIG. 1.
Figure 2B:
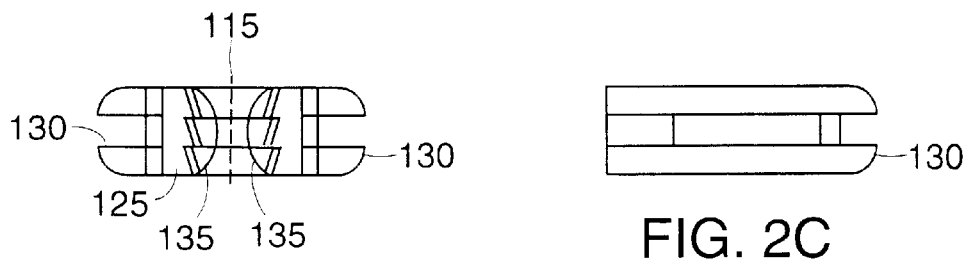
Figure 2C:
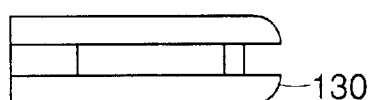

As best shown in FIG. 2B, three angled teeth 125 defined on each arm serve to retain the cable in the electrical box. The angled teeth 125 are positioned within the height of the arms 105 and rear portion 110, and do not extend further into the electrical box. This reduces the height of the side trap, reduces the amount of material used to make the side trap, and maximizes the amount of space available inside the electrical box for electrical connections. The angled teeth 125 allow an electrical cable to be pushed down through the trap, but inhibit the cable from being pulled up.

A groove 130 is formed along the sides and on the back of the side insertion trap 100 to secure the side insertion trap within the cutout of the electrical box. Resiliency of the arms holds the trap in place with the wall of the electrical box positioned in the groove.

Detents 135 laterally retain an electrical cable in the trap. The cable may be inserted laterally into the side insertion trap 100 in the direction 140 indicated in FIG. 1. The detents 135 squeeze the cable as it passes between them. Once the cable moves past the detents 135, the cable returns substantially to its original shape. Thereafter, detents 135 retain the cable in the trap and inhibit the cable from moving laterally out of the trap.

Figure 3A:
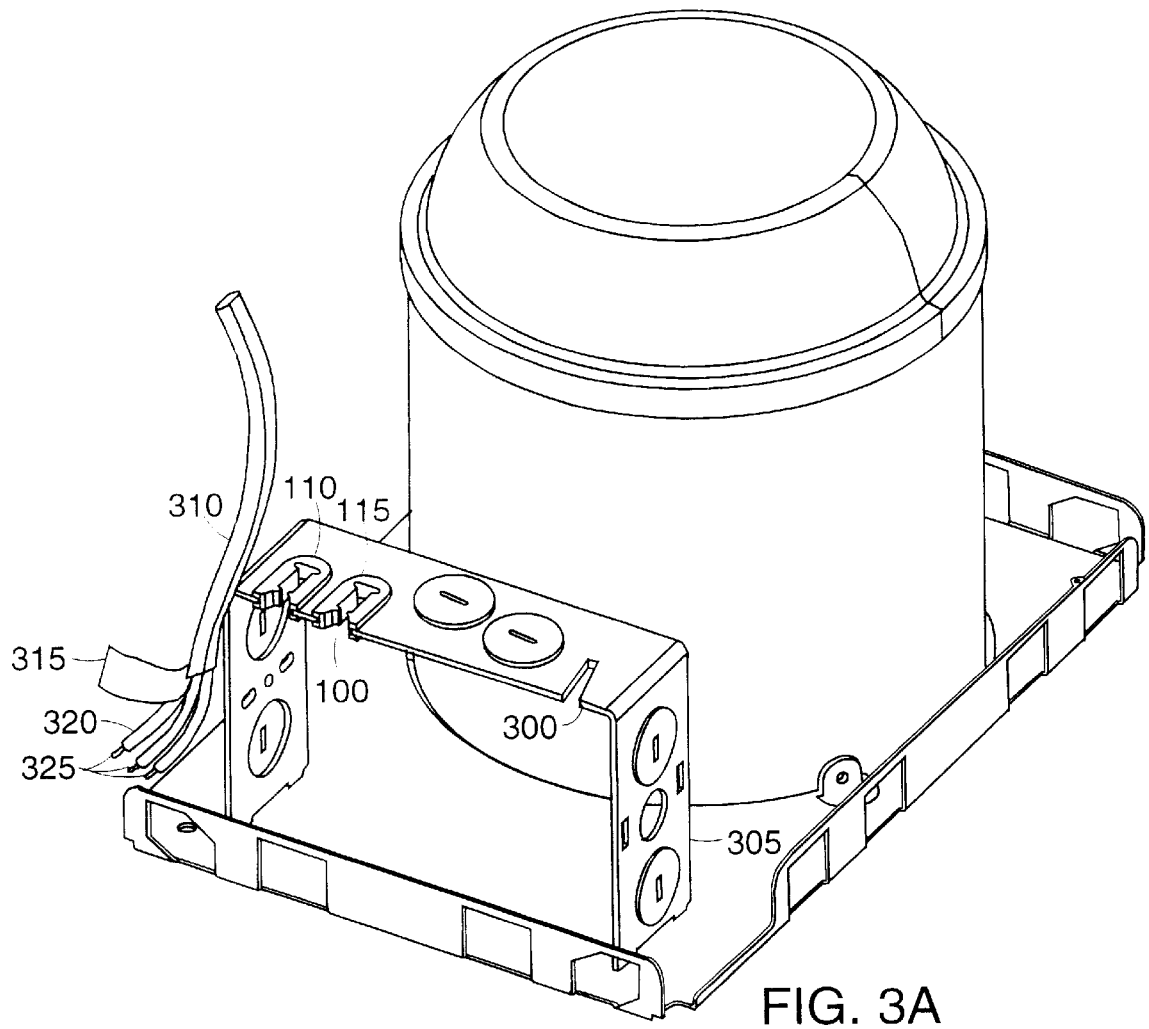
FIG. 3A is a perspective view of a lighting fixture and an electrical box including several side insertion traps with an electrical cable positioned to be inserted into one of the side insertion traps.
Figure 3B:
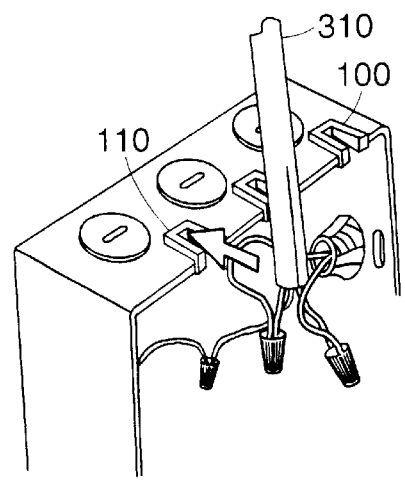
FIG. 3B is a perspective view of an electrical box in which the electrical connections are made prior to the electrical cable being positioned into the side insertion trap.

Referring to FIGS. 3A and 3B, side insertion traps 100 are positioned in an opening 300 cut in an electrical box 305. The electrical box 305 is comparable to a traditional electrical box, with the exception that it includes the openings 300 along its sides. A cable 310 may be inserted laterally into a side insertion trap 100. Because the cable does not need to be inserted into an enclosed opening, the cable sheath 315 and the insulators 320 of the individual wires 325 in the cable 310 can be removed before the cable is inserted laterally into the side insertion trap 100. Indeed, electrical connections may even be made prior to inserting the cable into the side insertion trap 100 as shown in FIG. 3B. This promises to substantially reduce the time associated with installing cables and electrical boxes since electricians will no longer be forced to strip wires and make connections within the confines or the immediate area of the electrical box.

Figure 4:
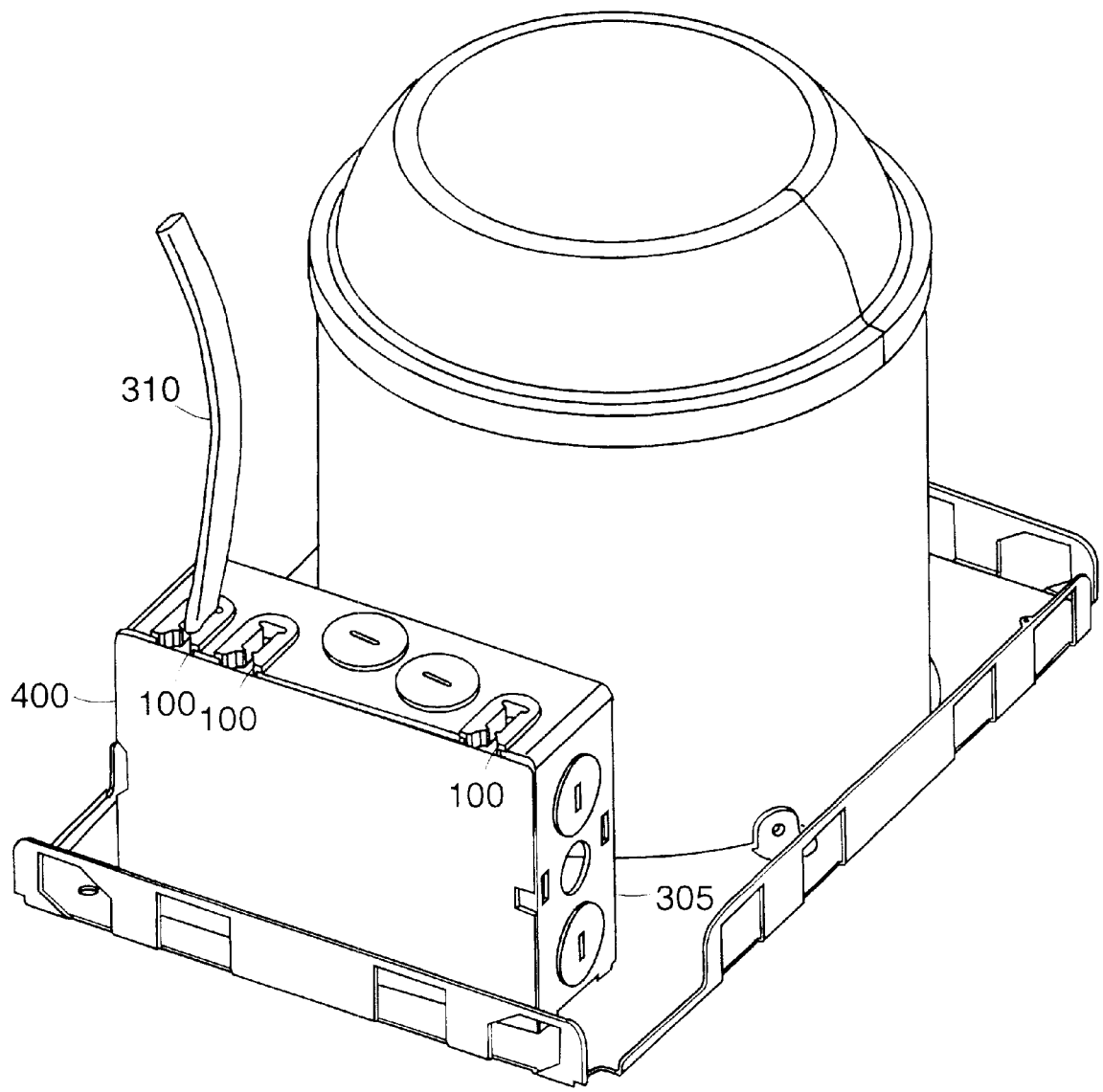
FIG. 4 is a perspective view of a lighting fixture with a covered electrical box and an electrical cable secured by a side insertion trap.
Figure 5:
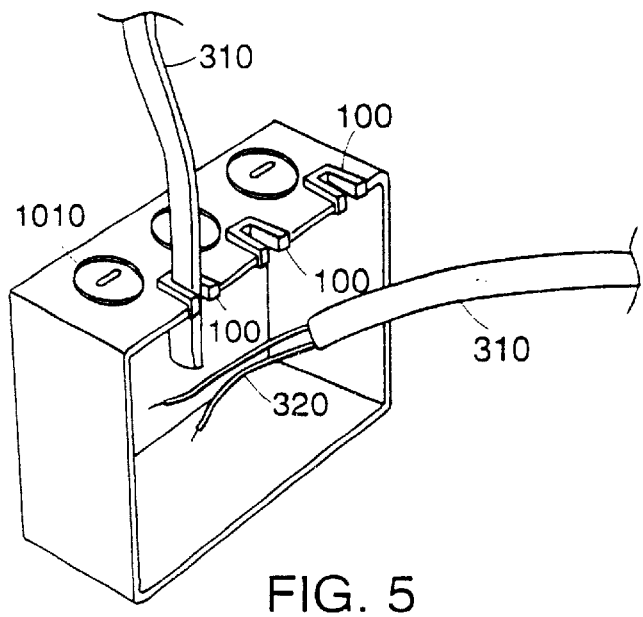
FIG. 5 is a perspective view of an electrical box including a side insertion trap with a cable inserted in the trap.
Figure 6:
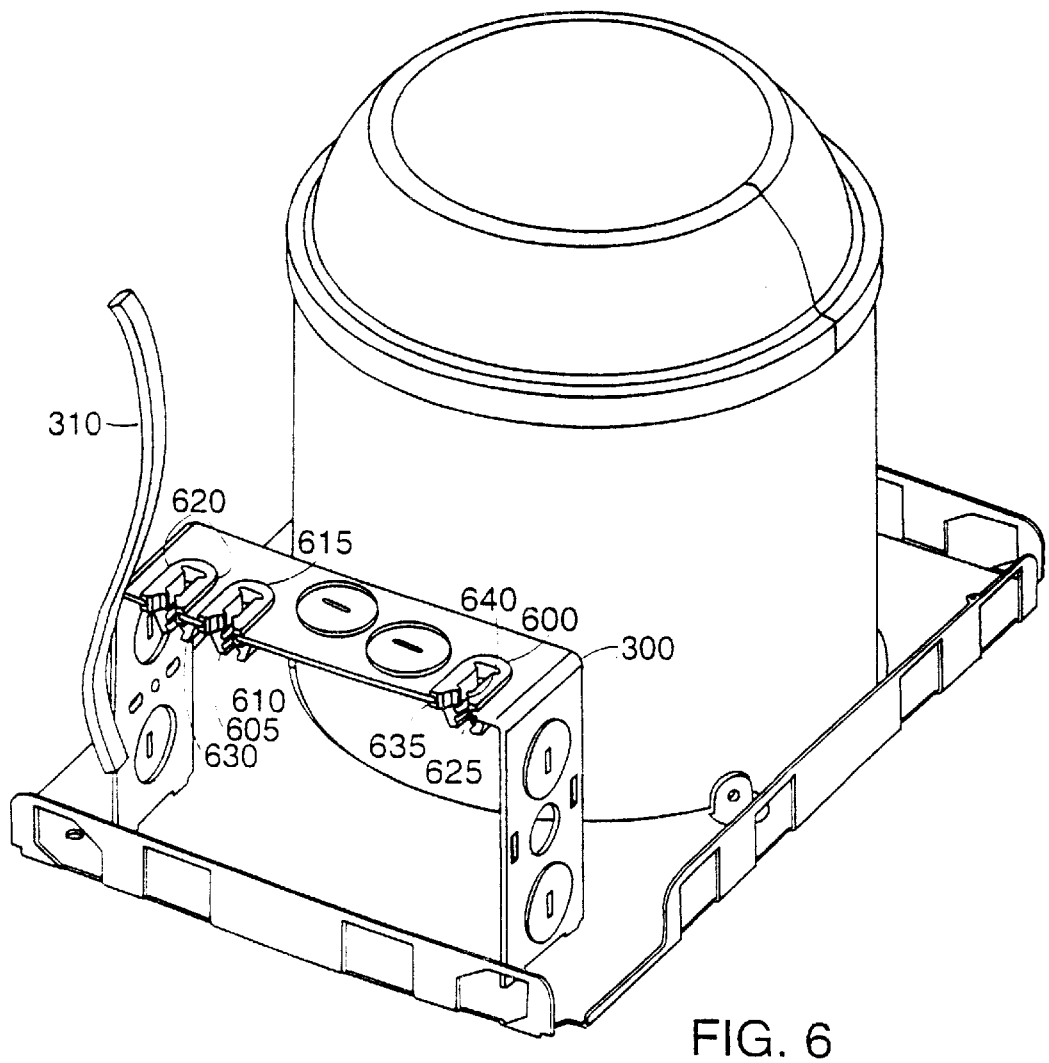
FIG. 6 is a perspective view of a lighting fixture with an electrical box including a second implementation of a side insertion trap.
Figure 7A:
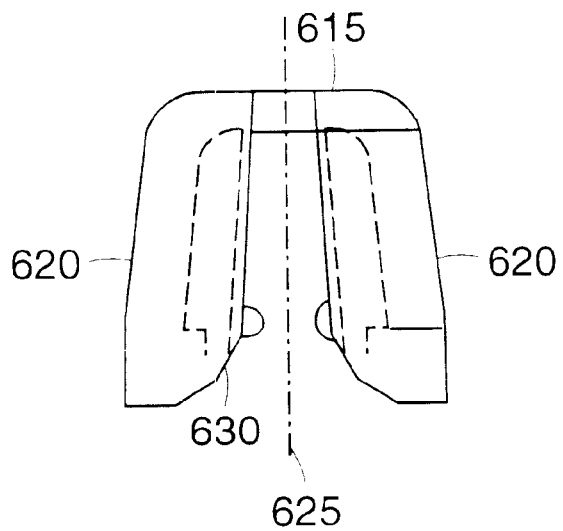
FIGS. 7A–7C are top, end and side views of the side insertion trap of FIG. 6.
Figure 7B:
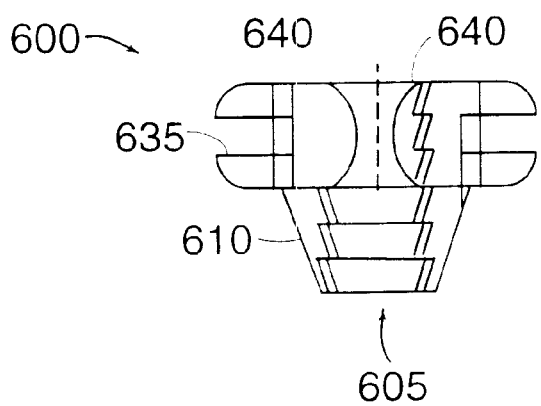
Figure 7C:
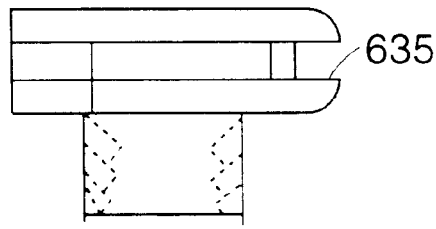

Once the electrical connections are made, and the electrical wires are properly inserted into the side insertion traps 100, the electrical box's cover 400 is placed on the electrical box as shown in FIG. 4. As shown in FIG. 5, the side insertion trap 100 also may be used in conjunction with traditional traps.

Referring to FIGS. 6 and 7A–7C, another side insertion trap 600 includes angled teeth 605 that extend beneath the trap. This increases the overall height of the trap and places the angled teeth 605 inside the electrical box 305. In this configuration, there are no angled teeth within the portion of the trap which passes through the side wall of the electrical box 305. Instead, the angled teeth are on the inner surface of the portion 610 of the trap which extends into the interior of the electrical box 305. The trap 600 also includes a rear portion 615, a pair of resilient arms 620, a passageway 625, cutouts 630, a groove 635, and detents 640. These elements function as discussed above with respect to trap 100.

Referring to FIGS. 8A–8E, another side insertion trap 800 includes box-like teeth 805, which may extend beneath the trap 800. This slightly increases the overall height of the trap. In this configuration, the majority of the box-like teeth are within the portion of the trap which passes through the side wall of the electrical box 305. The trap 800 includes a rear portion 805, a pair of resilient arms 810, a passageway 815, cutouts 820, and a groove 825. The cutout in the wall of the electrical box includes tabs which mate with indentations 830 in the groove 825. This mating between the indentations 830 and the tabs in the cutout in the wall of the electrical box 305 helps retain the side insertion trap 800 in place.

Referring to FIGS. 9A–9E, another side insertion trap 900 includes angled teeth 905 that are within the portion of the trap which passes through the side wall of the electrical box 305. The trap 900 includes a rear portion 905, a pair of resilient arms 910, a passageway 915, cutouts 920, and a groove 925. The cutout in the wall of the electrical box includes tabs which mate with indentations 930 in the groove 925. This mating between the indentations 930 and the tabs helps retain the side insertion trap 900 in place.

Referring to FIGS. 10 and 11A–11B, cutouts in the side wall of an electrical box 305 also may serve as a trap 1000. The trap 1000 includes angled portions 1005 that prevent an electrical cable from being pulled out of the electrical box.

The trap 1000 also includes a rear portion 1010 and a passageway 1015. A cable inserted laterally into the passageway 1015 is held in place longitudinally by the angled portions 1005.

Referring to FIG. 12, a cover 1200 for an electric box includes breakaway tabs 1205. A tab 1205 corresponding to a side insertion trap being used may be removed to allow room for the cable inserted in the side insertion trap.

Figure 14:
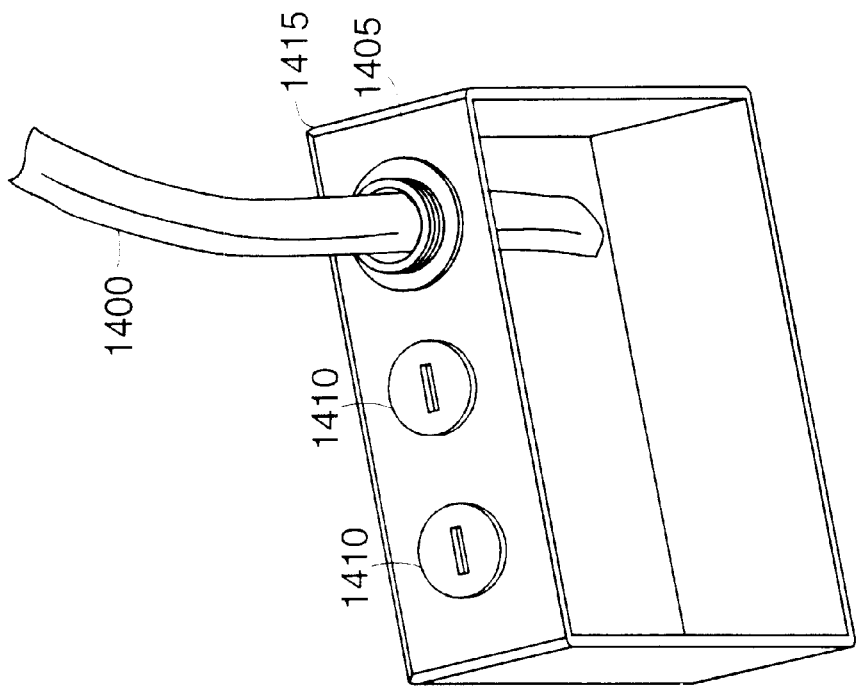
FIG. 14 is a perspective view of a prior art electrical box with a pre-punched knockout removed and a plastic trap and an electrical cable inserted through the plastic trap.
Figure 13:
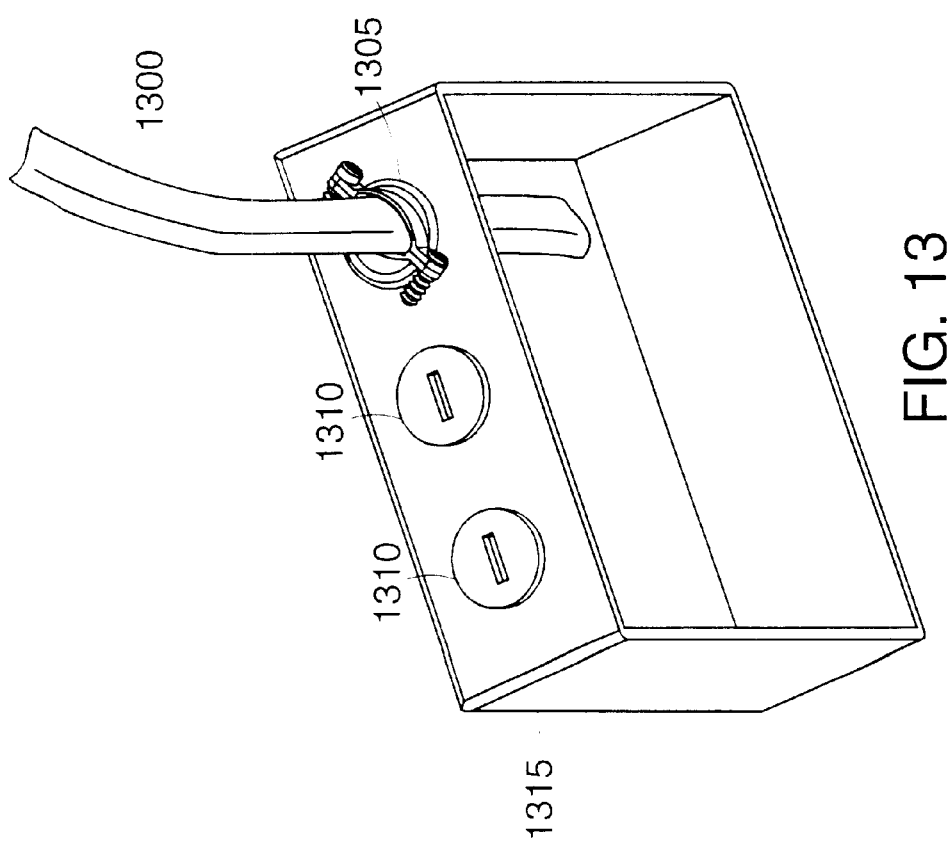
FIG. 13 is a perspective view of a prior art electrical box with a pre-punched knockout removed, a metal trap inserted, and an electrical cable inserted through the metal trap.

FIG. 13 shows an electrical cable 1300 retained by a prior art metal trap 1305 inserted through a pre-punched knockout 1310 in an electrical box 1315. FIG. 14 shows an electrical cable 1400 retained by a prior art plastic trap 1405 inserted through a pre-punched knockout 1410 in an electrical box 1415.

Figure 15:
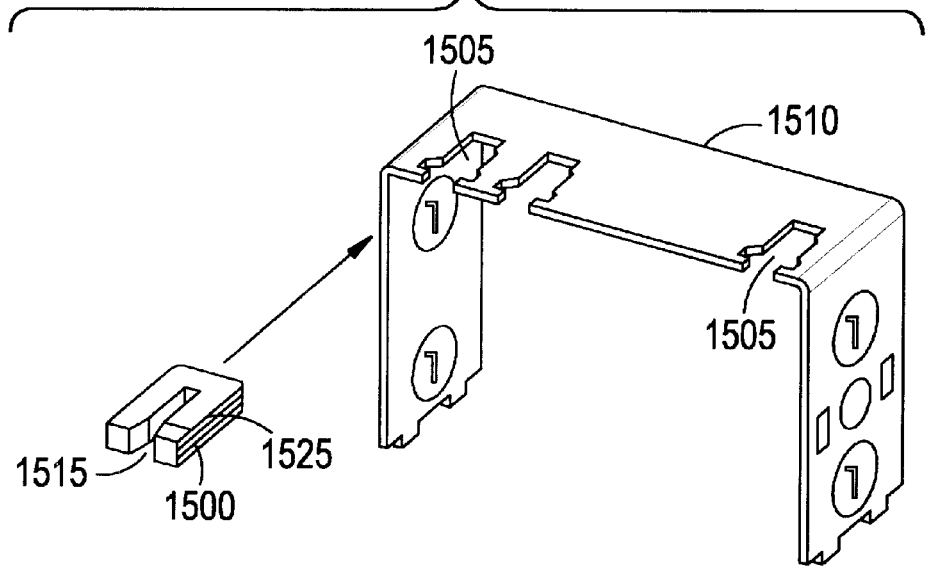
FIG. 15 is a perspective view of an electrical box and an invertible side insertion trap that fits within the electrical box.

Referring to FIG. 15, an invertible side insertion trap 1500 is configured to be used with multiple cables that vary by, for example, wire gauge. Examples of such cables include those having 14/2 or 12/2 gauge wire, or sheathed cable with or without a ground wire. For example, in one orientation, the trap 1500 retains 14/2 gauge wire. By removing, rotating, and then reinserting the trap 1500 within an opening 1505 cut into an electrical box 1510, a 12/2 gauge wire can be retained within the trap. As explained in greater detail below, the opening 1505 and the trap 1500 are shaped so that a passage 1515 through the trap when the trap is in a first orientation is wider relative to the passage then the trap is in an inverted orientation.

Figure 16:
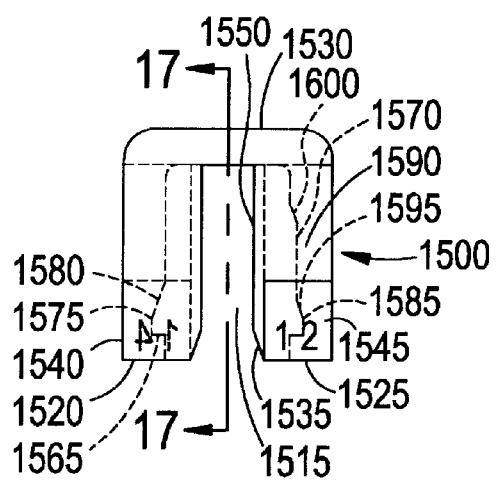
FIG. 16 is a top view of the invertible side insertion trap of FIG. 15.
Figure 17:
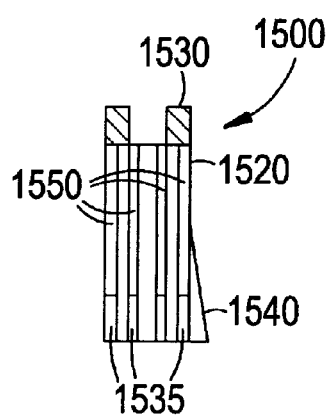
FIG. 17 is a cross-sectional side view of the invertible side insertion trap of FIG. 16 taken along section line 17—17.
Figure 18:
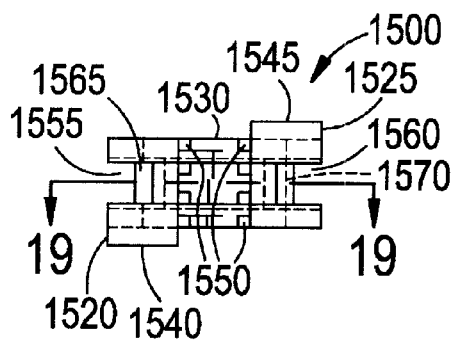
FIG. 18 is an end view of the invertible side insertion trap of FIG. 15.

Referring also to FIGS. 16–21, which illustrate various views of the invertible side insertion trap 1500, the trap includes a first resilient arm 1520 and a second resilient arm 1525 that extend from a rear portion 1530. The arms 1520 and 1525 define the passage 1515 through which a wire or cable may be laterally inserted. To ease cable insertion, a cutout 1535 on each arm 1520, 1525 provides the passage 1515 with a flared opening. Each arm 1520 and 1525 also includes a raised portion 1540 and a raised portion 1545, respectively, onto which, for example, the gauge of wire useable in the trap may be inscribed. As illustrated in FIGS. 16–18, the raised portions 1540, 1545 are on opposite sides of each arm 1520, 1525, although not on both sides of each arm. In this manner, a person knows that the passage 1515 is sized to accommodate the gauge of wire that is inscribed on the raised portion that is facing up.

Figure 20:
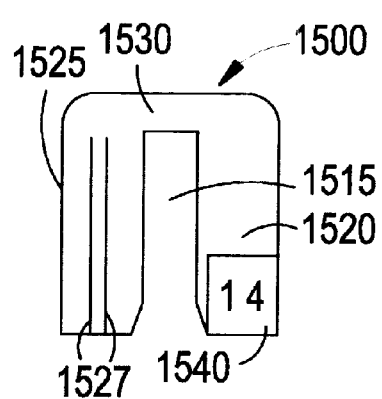
FIG. 20 is a bottom view of the invertible side insertion trap of FIG. 15.

As illustrated in FIG. 20, the arm 1525 also includes a pair of parallel cuts or inscribed lines 1527 that are made on the same side of the trap 1500 as one of the inscribed wire sizes on the arm 1520. The cuts 1527 assist a person using the trap to make a tactile distinction between the sides of the trap. The cuts 1527 also are useful in the production of electrical boxes in which the traps 1500 are inserted in a particular orientation by the manufacturer because the cuts provide visual and tactile evidence that the traps are inserted in the desired orientation.

Figure 21:
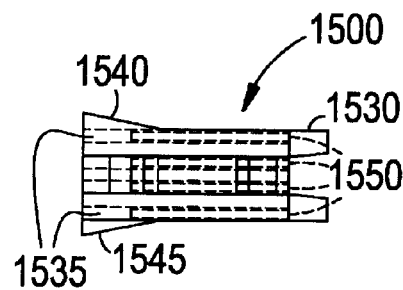
FIG. 21 is a side view of the invertible side insertion trap of FIG. 15 showing hidden view lines.

Each arm 1520, 1525 also includes teeth 1550 that project into the passage 1515. As illustrated in FIGS. 17, 18 and 21, for exemplary purposes, the invertible side insertion trap 1500 includes four pairs of opposing teeth 1550. However, the teeth 1550 on one arm can be configured to be vertically offset from the opposing teeth on the other arm. One arm also can be configured to have a different number of teeth than the other arm. For example, the arm 1520 can be configured to have three teeth 1550, the arm 1525 can be configured to have four teeth, and the teeth can be vertically offset. As also shown in FIG. 17, the cutouts 1535 are made into the teeth 1550, as part of forming the flared opening into the passage 1515.

Referring particularly to FIG. 18, slots 1555 and 1560, which are formed along the lengths of, respectively, arms 1520 and 1525, provide the mechanism that permits the gauge of wire accommodated by the trap 1500 to vary based on the orientation of the trap 1500. The slots 1555 and 1560 interact with mating portions 1565 and 1570 (FIG. 19) in an opening that receives the trap 1500 to control the width of the passage 1515. In particular, the mating portions 1565 and 1570 are configured to mate with one or more oppositely formed portions in the opening 1505 in a first position, but not in the inverted position. Thus, in one position, interaction of the slots and mating portions (or lack thereof) causes the arms to be pushed together and the passage narrowed, while in the other position, the interaction (or lack thereof) permits the arms to be further apart.

Figure 19:
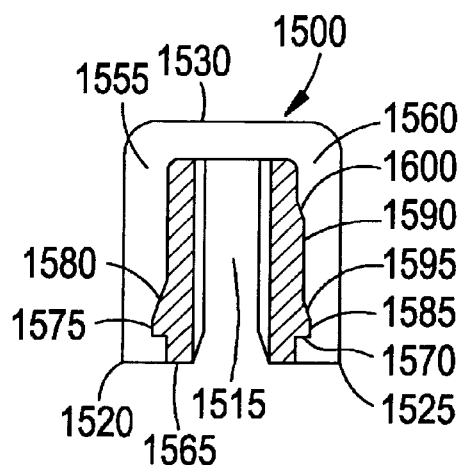
FIG. 19 is a cross-sectional top view of the invertible side insertion trap of FIG. 18 taken along section line 19—19.

As illustrated in FIGS. 16 and 19, each mating portion 1565, 1570 has a different shape. For example, the mating portion 1565 includes a raised portion 1575 that extends outwardly within the lengthwise slot 1555. A slanted connecting portion 1580 connects the raised portion 1575 with the slot 1555 to ease insertion of the trap 1500 into the opening 1505.

The mating portion 1570 includes a first raised portion 1585 and a second raised portion 1590. A first slanted connecting portion 1595 connects the first raised portion 1585 with the second raised portion 1590 and a second slanted connecting portion 1600 connects the second raised portion with the slot 1560 to ease insertion of the trap 1500 into the opening 1505.

Figure 22:
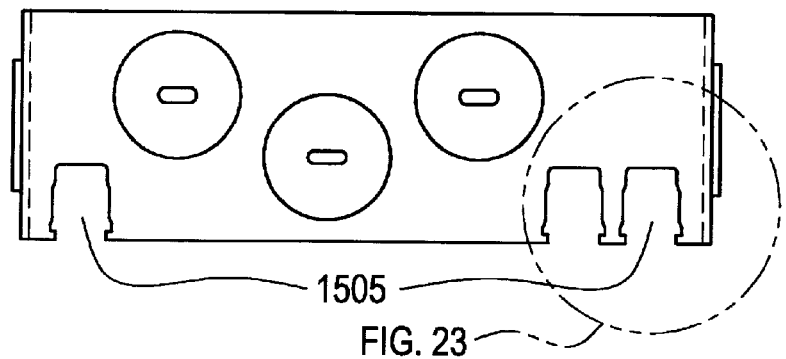
FIG. 22 is a top view of the electrical box of FIG. 15 showing the openings for inserting the invertible side insertion trap of FIG. 15.
Figure 23:
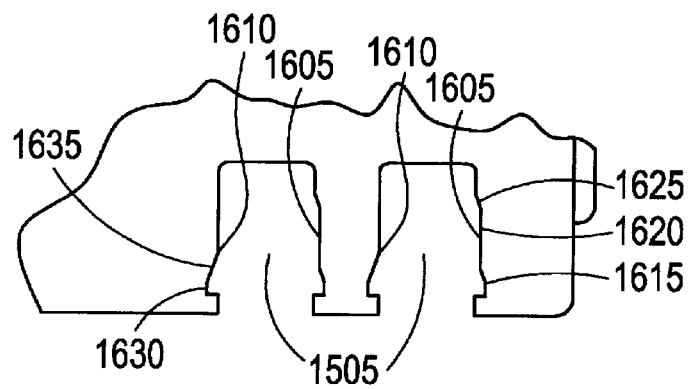
FIG. 23 is a detailed view of the openings of FIG. 22.
Figure 24:
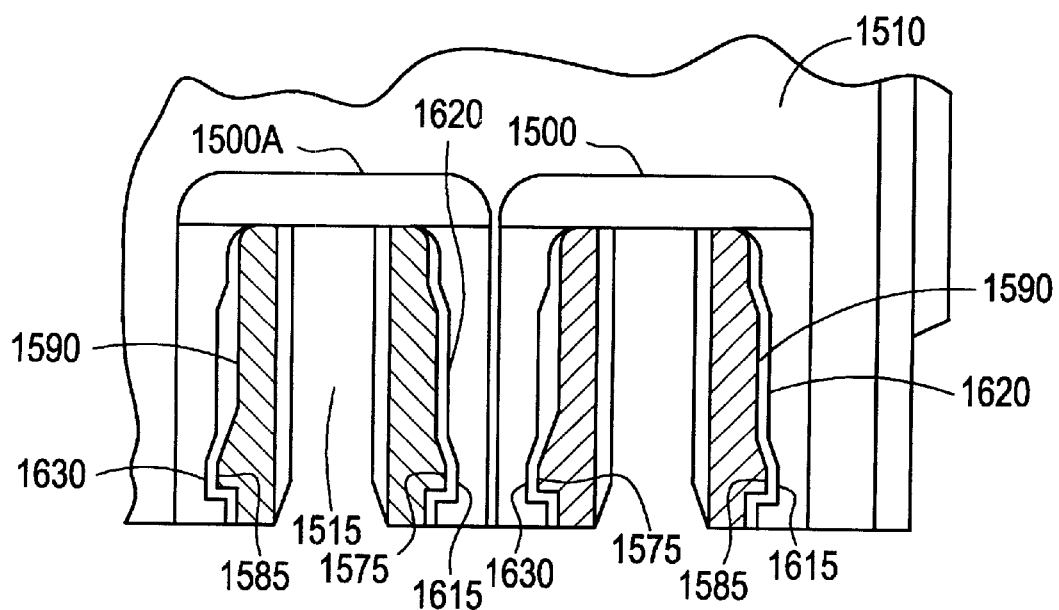
FIG. 24 is a detailed view of the openings of FIG. 22 showing the invertible side insertion traps inserted into the openings.

As illustrated in FIGS. 22–24, the resulting difference in shape between the mating portions 1565 and 1570 prevents the raised portion 1590 of the mating portion 1565 from fitting into an opening 1610 formed in the opening 1505. The opening 1610 is formed as the negative of the shape of the mating portion 1565. In this configuration, because the second extending portion 1590 extends further out of the slot 1560 than the length of the mating portion 1565 extends out of the slot 1555, the opening 1515 is narrower when the mating portion 1570 is adjacent to the opening 1610 than the opening is when the mating portion 1565 is adjacent to the opening 1610.

The passage 1515 includes the opening 1605 and an opening 1610. The opening 1605 includes a first region 1615 and a second region 1620 that are cut into a wall of an electrical box 1510, although at different depths. A slanted region 1625 connects the second region 1620 with the narrowest portion of the passage 1505. In general, the first region 1615, the second region 1620, and the slanted region 1625 form a negative of the shape formed by the raised portion 1570 of the arm 1525 such that the raised portion fits or mates with the regions 1615, 1620 and 1625.

Similarly, the opening 1610 includes regions that form a negative of the shape of the mating portion 1565. Specifically, the opening 1610 includes a first region 1630 and a slanted region 1635. In general, the first region 1630 and the slanted region 1635 form a negative of the shape formed by the mating portion 1565 of the arm 1520 such that the mating portion 1565 fits within the regions 1630 and 1635.

FIG. 24 shows an example of the trap 1500 oriented such that the mating portions 1565, 1570 fit within their respective negative shaped openings 1605 and 1610 in the electrical box 1510. FIG. 24 also shows an example 1500A of a trap being inverted, compared to the position of the trap 1500, such that the mating portions do not fit within the openings 1605 and 1610. Specifically, the trap 1500 has the mating portion 1565 of the arm 1520 adjacent to the regions 1630 and 1635 such that the raised portion 1575 and the slanted connecting portion 1580 fit within the respective corresponding regions 1630 and 1635. The trap also has the mating portion 1570 of the arm 1525 adjacent to the regions 1615, 1620, and 1625 such that the raised portions 1585, 1590 and the slanted connecting portions 1595, 1600 fit within the respective corresponding regions.

The trap 1500A, as noted above, is in an inverted position compared to the trap 1500. Consequently, the second raised portion 1590 rests against the opening 1610 without the first raised portion 1585 fitting within the region 1630. As such, the passage 1515 is not fully opened and thus, for example, a 14/2 gauge wire will fit within the passage while a 12/2 will not fit within the passage.

The trap 1500 and the opening 1505 in the electrical box can be configured in a number of ways to accommodate different wire or cable sizes. For example, the trap and opening can be configured such that the mating portions of the trap fit within their respective negative shaped openings in one orientation, but not in the other openings in the inverted orientation. The trap 1500 and the opening 1505 in the electrical box also can be configured such that one mating portion of the trap fits completely within a respective negative shaped opening in one orientation but only partially, or not at all, within a shaped opening in the inverted orientation.

The trap 1500 may be fabricated using any standard plastic forming method, such as injection molding or compression molding. The material used to form the trap may be any resilient plastic that is of a grade suitable for injection molding and/or compression molding, such as polyethylene, polypropylene, polycarbonate, nylon, or polyurethane. The opening 1505 may be formed using any standard metal cutting method such as by stamping or laser cutting.

Figure 25:
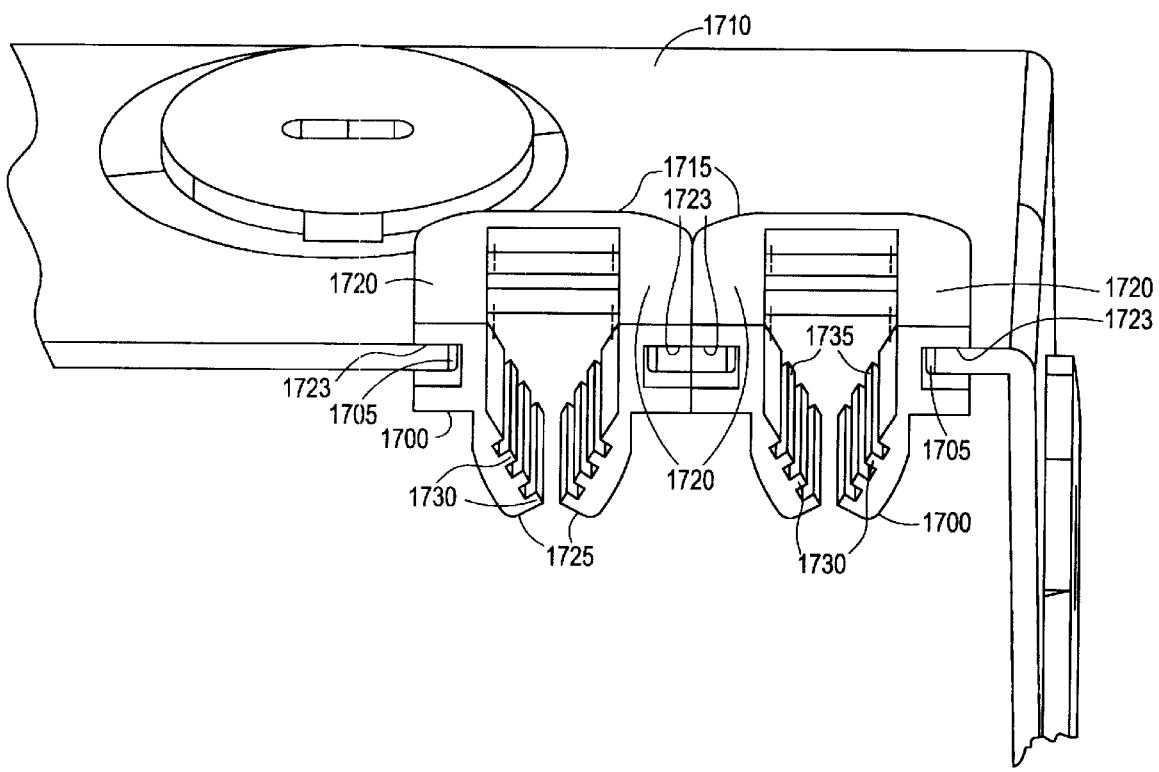
FIG. 25 is a perspective view of side insertion traps having vertical jaws inserted into openings in an electrical box.

Referring to FIG. 25, a side insertion trap 1700 is configured to be inserted into an opening 1705 in an electrical box 1710. The side insertion trap 1700 includes a rear portion 1715 from which a pair of arms 1720 extends. The trap 1700 includes grooves 1723 along the sides and on the back of the trap to secure the trap within the opening 1705. The resiliency of the arms holds the trap in place within the opening 1705. Each arm 1720 also includes a jaw 1725 that extends or projects below the arm. One or more teeth 1730 extend from the jaw 1725 in the direction of the opposing jaw. The jaws are resilient and, as such, can be forced outward by inserting a conductor between the jaws 1725 and arms 1720. Because of this resiliency and the space between the arms 1720, the trap 1700 can accommodate a range of conductor sizes. For example, the trap 1700 can accommodate 14/2, 14/3, 14/4, 12/2, 12/3, 12/4, 10/2, 10/3, and 10/4 sheathed cable with or without a ground wire. In addition, the resiliency of the jaws prevents or restricts the cable or wire from being pulled out from the jaws in a direction along the longitudinal axis of the cable or wire.

Figure 26:
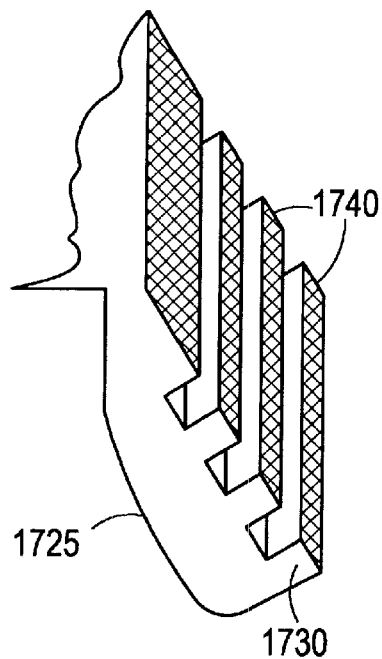
FIGS. 26–29 are perspective views of different configurations of a conductor contacting surface of the jaws.
Figure 27:
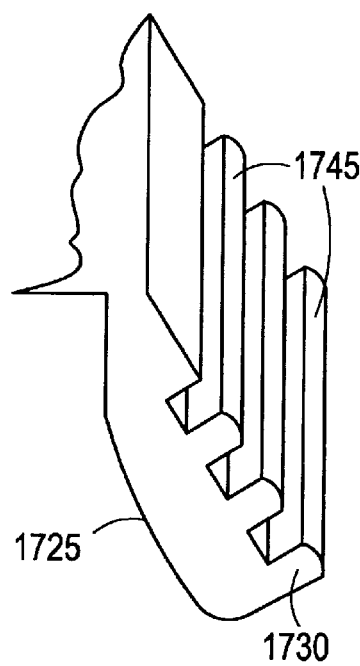
Figure 28:
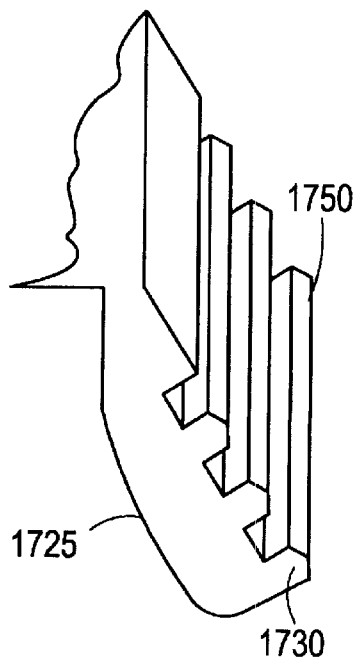
Figure 29:
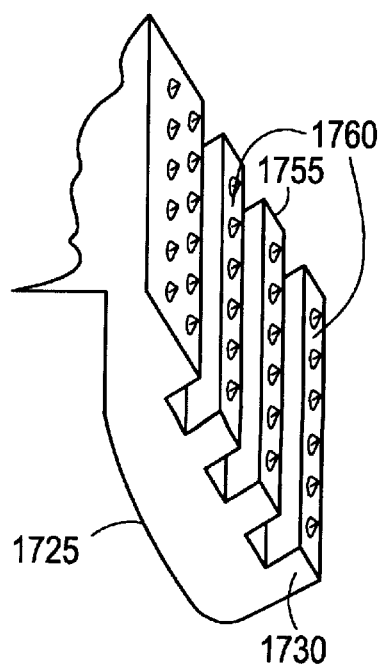

The teeth 1730 may have a smooth conductor contacting surface 1735, as illustrated in FIG. 25. Referring to FIG. 26, the teeth also may be fabricated with a textured conductor contacting surface 1740. The textured surface 1740 may be roughened through a mechanical means or during fabrication. Referring to FIGS. 27 and 28, the teeth 1730 may have a rounded surface 1745 or an angled surface 1750. Finally, as illustrated in FIG. 29, the teeth 1730 may have a flat surface 1755 onto which protrusions 1760 are formed or attached. The protrusions 1760 function to restrain a conductor from being pulled out of the jaws 1725. Although only a few examples of the configuration of the teeth are illustrated, any tooth configuration or design that retains the conductor can be used on the jaws.

Figure 30:
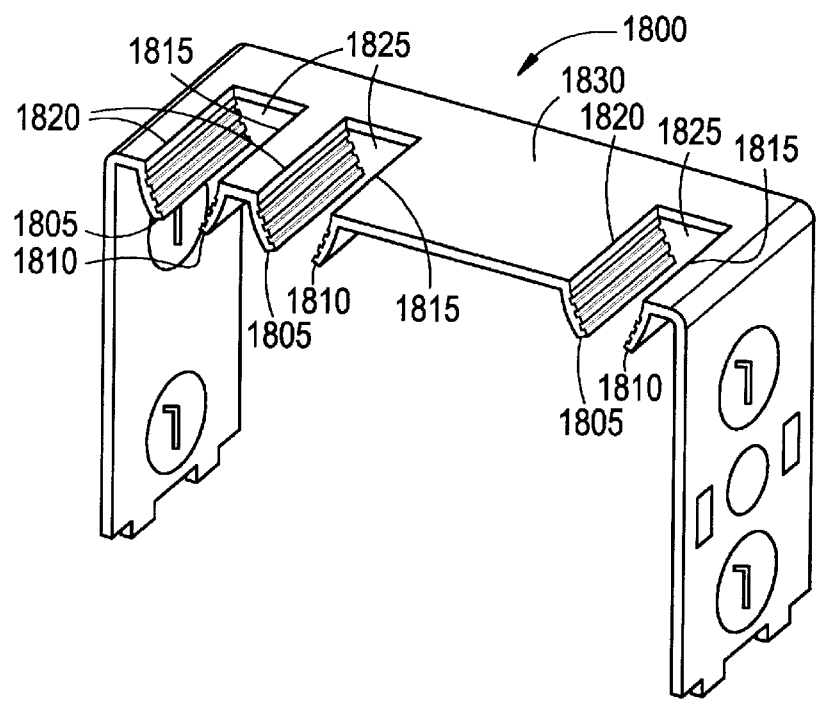
FIGS. 30 and 31 are perspective views of an electrical box having integral side insertion traps.
Figure 31:
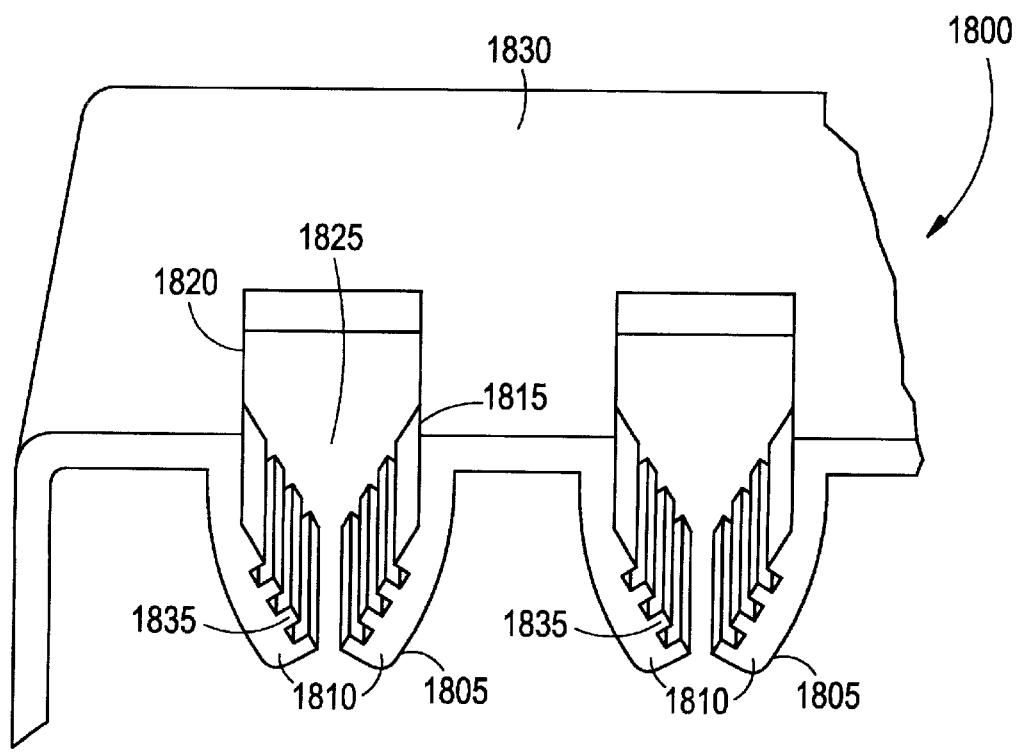

Referring to FIGS. 30 and 31, an electrical box 1800 includes integral side traps 1805. The electrical box 1800 and the traps 1805 are formed as a single unit by, for example, injection molding or compression molding of a plastic. Each side trap includes a pair of jaws 1810 that extends or projects below a right edge 1815 and a left edge 1820 of an opening 1825 in an upper surface 1830 of the electrical box 1800. One or more teeth 1835 extend from each jaw 1810 in the direction of the opposing jaw. The jaws are resilient and, as such, can be forced outwardly by inserting a conductor between the jaws 1810. Because of this resiliency and the space between the edges 1815, 1820, the trap 1805 can accommodate a size range of conductors. For example, the trap 1805 can accommodate 14/2, 14/3, 14/4, 12/2, 12/3, 12/4, 10/2, 10/3, and 10/4 sheathed cable with or without a ground wire.

Other embodiments are within the scope of the following claims.

What is claimed is:

1. An invertible side insertion trap configured to be inserted into a notch in an electrical box and to accommodate at least two different sizes of cable or wire depending on an orientation of the trap, the trap comprising:
   a base;
   a first arm extending from the base and including a first mating portion for mating with a first side of the opening in the electrical box; and
   a second arm extending from the base,
   wherein the arms define a passage having a first width for permitting insertion of a first cable or wire size between the arms when the trap is oriented in a first orientation with the first mating portion aligned with the first side of the opening, and having a second width for permitting insertion of a second cable or wire size between the arms when the trap is oriented in a second orientation which is opposite from the first orientation with the first mating portion aligned with a second side of the opening.

2. The invertible side insertion trap of claim 1, wherein the second arm includes a second mating portion for mating with the second side of the notch in the electrical box.

3. The invertible side trap of claim 2, wherein the second mating portion is configured to mate with the second side of the notch in the electrical box but not to mate with the first side of the notch in the electrical box.

4. The invertible side insertion trap of claim 2 wherein the second mating portion comprises a first raised portion extending from a surface of the second mating portion and a second raised portion extending from the surface of the second mating portion and the second side of the notch includes a region that is shaped as a negative of the raised portion.

5. The invertible side insertion trap of claim 4, wherein the first raised portion and the second raised portion extending from the surface of the second mating portion do not fit within the first side of the notch of the electrical box.

6. The invertible side insertion trap of claim 1, wherein the first mating portion is configured to mate with the first side of the notch in the electrical box but not to mate with the second side of the notch in the electrical box.

7. The invertible side insertion trap of claim 1, wherein the first mating portion comprises a raised portion extending from a surface of the first mating portion and the first side of the notch includes a region that is shaped as a negative of the raised portion.

8. The invertible side insertion trap of claim 7, wherein the raised portion extending from the surface of the first mating portion does not fit within the second side of the notch of the electrical box.

9. The invertible side insertion trap of claim 1, wherein the arms include teeth protruding into the first passage and the second passage.

10. The invertible side insertion trap of claim 1, wherein the first arm includes a raised portion extending from one surface of the first arm and the second arm includes a raised portion extending from an opposite surface of the second arm.

11. A system for retaining at least two different sizes of cables or wires in an invertible side insertion trap in an electrical box, the system comprising:
    an electrical box comprising a first wall and a pair of additional walls connected by the first wall, with the first wall including at least one notch; and
    an invertible side insertion trap comprising a base and a pair of arms defining a passage, where the arms and the notch are configured such that the passage has a first width when a first arm is positioned adjacent a first side of the notch and a second width which is narrower than the first width when the first arm is positioned adjacent a second side of the notch.

12. A side insertion trap for retaining cable or wire, the trap comprising:
    a base;
    two arms extending from the base to define an opening between the arms for permitting insertion of a cable or wire between the arms along a lateral insertion direction, with a central axis of the cable or wire being generally perpendicular to the lateral insertion direction; and
    a pair of jaws extending from the arms, each jaw including at least one tooth oriented in a direction towards the opposite tooth.

13. The side insertion trap of claim 12, wherein the arms and the jaws define a passage and the teeth extend into the passage.

14. The side insertion trap of claim 13, wherein each jaw extends from the arms at an angle to define a narrowing of the passage.

15. The side insertion trap of claim 12, wherein the teeth have a rectangular configuration and define a surface oriented in the direction of the passage.

16. The side insertion trap of claim 13, wherein the surface includes at least one protrusion.

17. The side insertion trap of claim 13, wherein the surface comprises a textured surface.

18. The side insertion trap of claim 12, wherein the teeth have a rounded configuration.

19. The side insertion trap of claim 12, wherein the teeth have an angled configuration.

20. An electrical box with at least one integral side trap for retaining cable or wire, comprising:
    a first wall including at least one notch and a pair of additional walls connected to the first wall; and
    the side trap for retaining cable or wire comprising a pair of jaws extending from the first wall on opposite sides of the notch configured to receive a cable or wire by lateral insertion into the notch, with a central axis of the cable or wire being generally perpendicular to the lateral insertion direction.

21. The electrical box of claim 20, wherein the jaws define a passage and teeth extend into the passage from the jaws.

22. The electrical box of claim 21, wherein each jaw extends from the wall at an angle to define a narrowing of the passage.

23. The side insertion trap of claim 21, wherein the teeth have a rectangular configuration and define a surface oriented in the direction of the passage.

* * * * *